United States Patent [19]

Martin

[11] 4,454,175

[45] Jun. 12, 1984

[54] METHOD OF APPLYING LUBRICANT COATING TO BULLETS

[76] Inventor: Merrill D. Martin, 2 Mall Ct., Oakland, Calif. 94611

[21] Appl. No.: 520,638

[22] Filed: Aug. 5, 1983

Related U.S. Application Data

[63] Continuation-in-part of Ser. No. 348,597, Feb. 12, 1982, abandoned.

[51] Int. Cl.³ ............................................... B05D 3/12
[52] U.S. Cl. ...................................... 427/242; 102/511
[58] Field of Search ....................... 118/418; 427/242; 102/511

[56] References Cited

U.S. PATENT DOCUMENTS

| | | | |
|---|---|---|---|
| 3,387,985 | 6/1968 | Huber | 427/242 X |
| 3,549,357 | 12/1970 | Osborne | 75/208 |
| 4,196,670 | 4/1980 | Vatsvog | 102/92 |

OTHER PUBLICATIONS

Bremner, R. C., *Mechanical Plating: safe and sure protection for critical parts,* Machine Design, Sep. 20, 1973, pp. 162–166.

*Primary Examiner*—Evan K. Lawrence
*Attorney, Agent, or Firm*—Alfons Puishes

[57] ABSTRACT

Metal jacketed or lead alloy bullets are placed in a tumbler and mixed with a predetermined quantity of steel shot and molybdenum disulphide powder and corn cob grits or other fibrous material. The mixture is tumbled for a predetermined time until the molybdenum disulphide forms a coating adhering to the outside surface under the impact of the steel shot. The fibrous material acts to polish the surface of the bullets. This coating acts as a highly superior heat resisting and friction resisting lubricant which preserves the interior of the rifle barrel and improves the accuracy of the shooting.

7 Claims, No Drawings

METHOD OF APPLYING LUBRICANT COATING TO BULLETS

This application is a continuation-in-part of my co-pending application Ser. No. 348,597 filed 2/12/82, abandoned.

BACKGROUND OF THE INVENTION

The desirability of applying a lubricant to the coating of bullets to be fired from a rifle has been recognized in the art for some time. Much of the work has been concerned with bullet slugs comprising an alloy of lead, tin and antimony and entailed the use of a wax-like lubricant applied to the surface thereof. In these applications, the wax adhered to the rifle barrel during firing. Maintenance of cleanliness of the interior of the rifle barrel and freedom from fouling are important in maintaining accuracy of the rifle firing which cannot be achieved by use of wax-like lubricants.

Examples of the prior art of this categary known to me at the present time are as follows:

U.S. Pat. No. 2,547,548 to Turner discloses a machine for continuously conveying bullets through a preheating area where they are preheated prior to applying a lubricant, which is solid at ordinary temperatures, but is rendered liquid by said heat to the surface of the bullet where it forms a film thereon.

U.S. Pat. No. 2,728,260 to Mills discloses an apparatus where cartridges enclosed in containers are transported in a conveyor through a bath of heated grease which is solid at ordinary temperatures and raised out of the bath to produce a solidified lubricated uniform surface thereon.

U.S. Pat. No. 2,403,032 to Stevens and U.S. Pat. No. 3,967,526 to Leich both combine the process of die forming of lead alloy slugs to final dimensions while at the same time applying a grease type of lubricant to grooves in the surface of these slugs.

Each of the foregoing all four patents have the disadvantage of the wax adhering to the interior of the barrel of the rifle as mentioned above.

U.S. Pat. No. 3,431,612 to Darigo teaches the formation of a jacket of harder metal such as copper or copper alloy upon the surface of the lead slug to form a metal jacketed bullet by electro-deposition. Various other methods of applying metal jackets to produce a superior bullet are disclosed but none of them disclose any method of lubricating the bullet so formed.

Efforts have been made to utilize molybdenum disulphide ($MoS_2$) as a bullet lubricating coating, particularly as disclosed by Vatsvog in U.S. Pat. No. 4,196,670. Molybdenum disulphide is a hard substance occurring in nature as an Ore of molybdenum, is quite hard and has high pressure lubricating qualities but is highly immiscible and insoluble in most reagents thereby making it impossible to apply it successfully as a coating to a metal surface by ordinary means. Vatsvog in his patent attempts to mix a dispersion of molybydenum disulphide in a synthetic resin dissolved in a volatile hydrocarbon and upon evaporation of the latter relies on the resin to cause the molybdenum disulphide to adhere to the bullet surface. I also have attempted to utilize various resins and adhesives to cause molybdenum disulphide to adhere to a bullet surface but found them all unsuccessful as not producing a uniform coating and not causing sufficient adherence to withstand the heat and pressure found inside a gun barrel. In each case this has caused the molybdenum disulphide to flake off and not provide the lubrication sought after. A stronger bond between the molybdenum disulphide and the bullet surface is required.

The fouling of the interior of the rifle barrel after only a relatively few shots and thus impairing the accuracy of the firing, as well as wear on the rifle barrel is a problem which has remained unsolved successfully until my invention described herein.

SUMMARY OF THE INVENTION

I have discovered a method of mechanical plating for applying a film of molybdenum disulphide ($MoS_2$) which retains its hard heat resisting high pressure lubricating qualities and a polished exterior to the surface of a bullet either having a lead slug or to a metal (copper or steel) jacketed bullet which provides tremendously improved lubricating qualities to withstand the high temperature and pressures within a rifle barrel and preserve the interior of the latter. Molybdenum disulphide also known as molybdenite is available commercially in powdered form under the trade name of "Molykote" manufactured by Dow Corning and its use in forming a lubricating surface to bullets by the method of application which I have invented and described below, form the basis of this invention.

In the following illustration I describe a typical process and quantities which, of course, may be varied to obtain somewhat varying results utilizing basically the same steps and principles of operation.

DESCRIPTION OF MY PROCESS

I start with a typical commercial tumbler such as that used to tumble and clean brass castings in a barrel. One such tumber is known commercially as the "Viking". Into this I place a charge of spherical steel shot, varying from 0.060 inches to 0.090 inches in diameter, selecting a tumbler that would hold about 4 pounds of shot and 100, 30 caliber bullets or the equivalent of any weight from 125 grains to 200 grains. Into this I pour approximately one-half ounce of the aforementioned molybdenum disulphide powder which may be of the aforementioned "Molykote", and having a fineness of 4 to 10 microns. To this I add 25% to 50% by volume of granulated, fibrous material of medium fineness such as corn cob grits which are commercially available. I then rotate the tumbler and have discovered that the impact of the steel shot mixed with the powder and fibrous material causes a fine hard film of molybdenum disulphide to form on the relatively soft outside surface of the bullets by what may be characterized as a form of mechanical plating and polishing, leaving a smooth surface after a single operation as described above. I may operate the tumbler anywhere from two to six hours at approximately 60 RPM depending upon how thick a film of the lubricant is desired. I have found that when tumbling for about 4 or 5 hours, the diameter of the bullet increases about 0.0003 inches. I have been able to increase the diameter of the bullet by 0.0007 inches but the 0.0003 inches seems to be most satisfactory for best all around results.

The process described above comprises a form of mechanical plating and the coating so formed adheres very strongly to the bullet surface, is very difficult to remove, presents a polished surface and is not effected by being pushed tightly or seated in its cartridge case neck. In other words, it does not rub off very readily or at all and requires no further processing to be effective.

I have found that the interior of the rifle barrel remains smooth, often after more than 40 shots have been fired and often requires no cleaning after many more shots.

I am aware of U.S. Pat. No. 3,387,985 to Huber which produces a molybdenum disulphide surface on ball bearings by tumbling them in a first polishing drum in the presence of molybdenum disulphide powder. No impacting medium such as steel shot is used and the first polishing operation must be followed by a second operation in another drum to compact the surface. Huber then must subject his balls to a solvent and ultrasonic cleaning to remove particles of molybdenum disulphide which still adhere to the surface. In my operation I eliminate the latter two steps and my bullets emerge from the first tumbling operation with a tight and smooth film produced by the impact action of the steel shot and the polishing action of the fibrous material. A principal difference in my process is that I utilize a third medium, the steel shot to effect the molybdenum disulphide coating rather than only on the tumbling of the article to be coated itself in a powder.

As related art, I am aware also of U.S. Pat. No. 3,549,357 to Osborne which teaches compacting and sintering powdered iron articles, tumbling in the presence of a soft metal such as copper, tin, cadmium or zinc and removing excess coating and sintering again. In this case the tumbling operation is merely incidental to the sintering steps, is applicable only to the soft metals such as stated and is in no way suggestive of my coating process.

The improved lubricating qualities I obtain increase the accuracy of the firing and the interior surface of the rifle appears to be from galling.

I have made tests in precision "bench rest" shooting at targets and found the accuracy with bullets coated by my method to produce highly superior accuracy compared to that when using regular uncoated bullets, which latter require cleaning of the bore of the rifle after firing 5 or 10 shots to keep down the metal fouling.

In recent competitions in "bench rest" target shooting, rifles using bullets coated as I have described herein, have won ten consecutive contests over rifles firing uncoated bullets. The superiority and accuracy of shooting I have found to be astounding.

Most of my experiments have been carried out on metal (copper or steel) jacketed bullets, but my process is equally applicable to lead alloy slug types of bullets.

The use of my coated bullets I have found also to prolong the life of the rifle barrel.

I claim:

1. A method of applying a lubricating coating of molybdenum disulphide ($MoS_2$) to the outer surface of bullets comprising the steps:
    placing a predetermined number of bullets in a tumbler containing a barrel;
    adding a predetermined amount of spherical steel shot to said barrel;
    mixing the above ingredients with a predetermined amount of molybdenum disulphide ($MoS_2$) powder within said barrel;
    adding a predetermined amount of a granulated fibrous material for polishing said lubricating coating of the above ingredients completing the mixture in said barrel;
    impacting said shot within said mixture upon said bullets by tumbling said barrel containing said bullets and said mixture until a fine film of molybdenum disulphide having a polished surface is made to adhere to the outer surface of said bullets.

2. The method of claim 1 in which said tumbler is operated at relatively slow speed continuously for a period of two to six hours and said film attains a thickness of 0.00015 inches to 0.00035 inches.

3. The method of claim 1 in which said predetermined amount of spherical steel shot varies from 0.060 inches to 0.090 inches in diameter.

4. The method of claim 1 in which said steel shot bears a ratio of four pounds of shot per the equivalent of 100, 30 caliber bullets.

5. The method of claim 1 in which said molybdenum disulphide powder has a fineness of 4 to 10 microns and bears a ratio of one-half ounce powder to four pounds of steel shot.

6. The method of claim 1 in which said granulated fibrous material comprises fine corn cob grits.

7. A method of mechanical plating and polishing the surface of a bullet with molybdenum disulphide by subjecting said bullet to the inpact of steel shot in the presence of a mixture of powdered molybdenum disulphide and a fine granulated fibrous material for polishing the plated surface of the bullet, said impact being produced by rotating said bullet together with said mixture and said shot in a tumbler until the desired plated and polished surface is produced.

* * * * *